United States Patent
Dennert et al.

(10) Patent No.: US 6,846,018 B2
(45) Date of Patent: Jan. 25, 2005

(54) MOTORCYCLE FRAME HAVING REMOVABLE PORTION

(75) Inventors: Robert L. Dennert, Waukesha, WI (US); R. Bruce Dennert, Mukwonago, WI (US); Paul Lohr, Waukesha, WI (US); Michael W. Hamann, Pewaukee, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/159,443

(22) Filed: May 31, 2002

(65) Prior Publication Data

US 2003/0222425 A1 Dec. 4, 2003

(51) Int. Cl.$^7$ .................................................. B62H 1/00
(52) U.S. Cl. ...................... 280/785; 280/781; 280/291; 180/219
(58) Field of Search ................................ 280/287, 278, 280/299, 302, 274, 281.1, 781, 785, 291; 180/311, 219

(56) References Cited

U.S. PATENT DOCUMENTS

| | | | | |
|---|---|---|---|---|
| 3,945,463 A | * | 3/1976 | Okano et al. ............... 184/6.13 |
| 4,461,366 A | * | 7/1984 | Honda ......................... 180/229 |
| 4,660,854 A | * | 4/1987 | Suzuki et al. ................ 280/782 |
| 4,805,716 A | * | 2/1989 | Tsunoda et al. ............. 180/219 |
| 5,248,012 A | | 9/1993 | Kurawaki et al. |
| 5,284,221 A | * | 2/1994 | Warne ......................... 180/219 |
| 5,377,776 A | * | 1/1995 | Saiki ........................... 180/219 |
| 5,704,442 A | * | 1/1998 | Okazaki et al. ............. 180/219 |
| 5,845,728 A | * | 12/1998 | Itoh et al. .................... 180/219 |
| 5,921,339 A | * | 7/1999 | Matsuura ..................... 180/219 |
| 6,446,996 B1 | * | 9/2002 | Horii ......................... 280/281.1 |

* cited by examiner

*Primary Examiner*—Lesley D. Morris
*Assistant Examiner*—Tony Winner
(74) *Attorney, Agent, or Firm*—Michael Best & Friedrich, LLP (57) ABSTRACT

A motorcycle frame including a base portion and a removable portion that both bear operating loads of the motorcycle. The removable portion and base portion are fastened together at a joint comprising a first end cap having a protrusion, a second end cap having a recess, and a fastener having a fastener axis and extending through the first and second end caps. The protrusion and the recess are characterized by angled walls oriented at an acute angle with respect to the fastener axis. The angled wall engagement of the end caps ensures that substantially all shear loads in the joint are born by the end caps and not by the fastener. The motorcycle footpeg position can be changed by replacing the removable portion with a second removable portion having footpeg mounting structure at a different location than the removable portion.

19 Claims, 6 Drawing Sheets

MOTORCYCLE FRAME HAVING REMOVABLE PORTION

FIELD OF THE INVENTION

The invention relates to motorcycle frames, and more particularly to motorcycle frames having a removable portion.

BACKGROUND

Virtually all motorcycles utilize some type of frame structure to carry loads encountered during vehicle operation. One type of frame structure known as a twin-spar frame typically uses a pair of large cross section aluminum beams that extend from the motorcycle steering head and around the sides of the engine to the swingarm pivot. As such, the engine is at least partially surrounded by frame structure on its right and left sides. Another type of frame structure is known as a cradle frame. The cradle frame generally includes one or more structural members extending over the top of the engine, and one or more structural members extending below the engine. Both types of frames support a wide variety of motorcycle components including the engine, fuel tank, seat, and footpegs, as well as other items.

Most motorcycle frames, whether twin-spar or cradle style, are fabricated (e.g. cast and/or welded) as one-piece assemblies. Several limitations arise when a motorcycle frame is fabricated as a single piece. While the unitary construction is generally very strong, installation and removal of the engine are often difficult, especially when it is aesthetically desirable to package the engine as tightly within the frame as possible. Furthermore, alterations to the frame, such as relocation of the footpegs or other items that mount to the frame, can be difficult and time consuming. For a consumer, such alterations generally require cutting, grinding, and welding of the frame, all of which may weaken the frame as well as detract from its appearance. For a manufacturer that may want to develop an entire vehicle line using a single style of frame, such minor alterations often require expensive new tooling and/or fabrication equipment.

Therefore, a new motorcycle frame that facilitates installation and removal of the engine and simplifies the process of relocating certain motorcycle components, while simultaneously fulfilling the structural requirements of a motorcycle frame would be welcomed by those in the art.

SUMMARY

The invention provides a method for relocating the position of a footpeg on a motorcycle frame having a base portion and a first removable portion removably mounted to the base portion at a joint. The first removable portion has footpeg mounting structure affixed thereto at a first footpeg position. The method includes providing a second removable portion that is removably mountable to the base portion at the joint and includes footpeg mounting structure at a second footpeg position different from the first footpeg position. The position of the footpeg may therefore be changed by removing the first removable portion from the base portion, and replacing it with the second removable portion. The original footpeg, or a new footpeg if desired, may then be mounted to the footpeg mounting structure of the second removable portion in the second footpeg position.

The invention also provides a joint for fastening the removable portion to the base portion. The joint includes male and female profile end caps mounted to the removable portion and to the base portion. The male and female profiles snugly engage each other, and a fastener is extended through the joint along a fastener axis. The male and female profiles include walls that are oriented at an acute angle with respect to the fastener axis. The snug engagement of the male and female end caps and the angled engagement of the walls in the joint cause the walls to bear a substantial majority of the shear stress in the joint, and substantially reduce the shear stress on the fastener.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
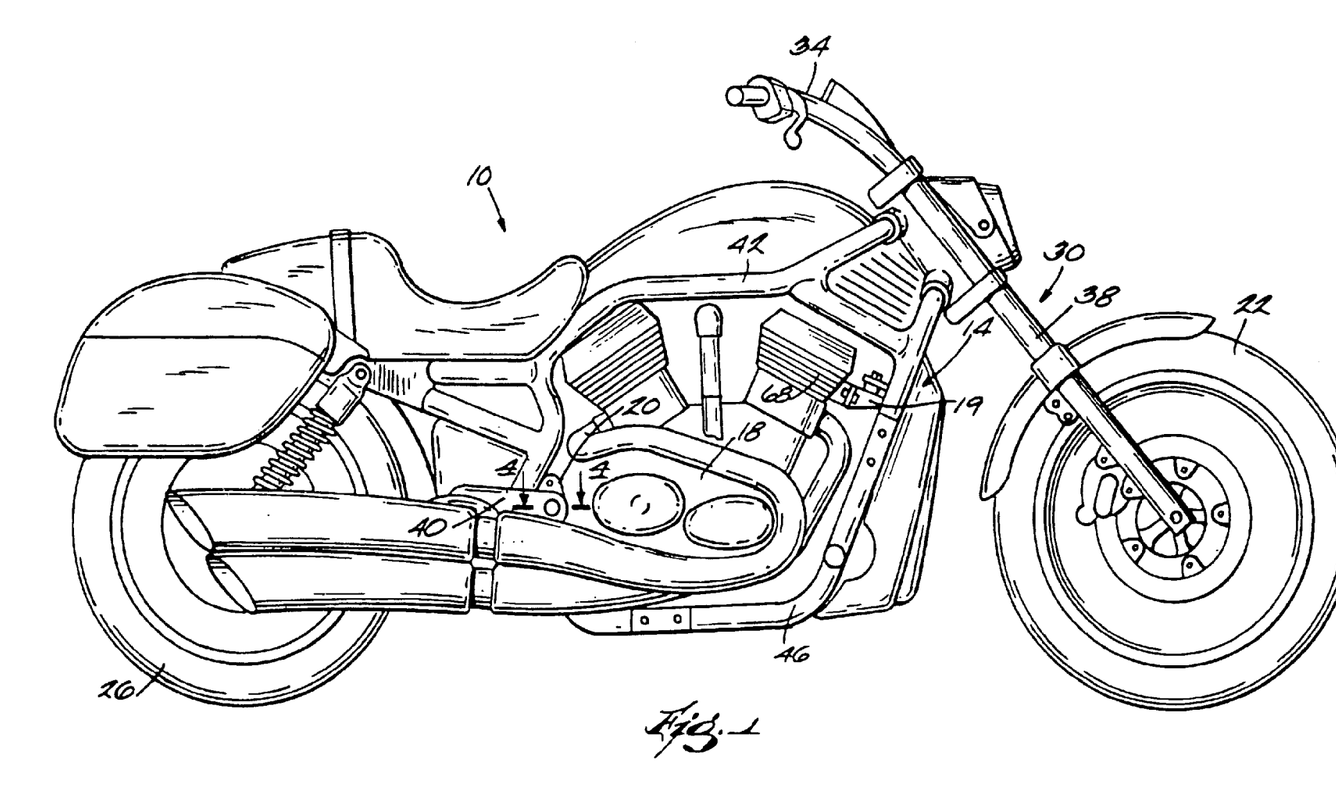
FIG. 1 is a side view of a motorcycle embodying the invention.

FIG. 1 illustrates a motorcycle 10 comprising a cradle-style frame 14, an engine and drive train assembly 18 isolatingly mounted to the frame 14 by resilient mount assemblies 19, 20, front and rear wheels 22, 26 supporting the frame 14, a steering assembly 30 including handlebars 34 and a fork 38 mounted to the front wheel 22 and pivotal with respect to the frame 14, and a swing arm 40 (partially hidden) interconnecting the rear wheel 26 to the frame 14. Although the invention is illustrated and described with respect to a cradle-style frame, the teachings are also applicable to twin-spar frames as well as other frame types.

Figure 2:
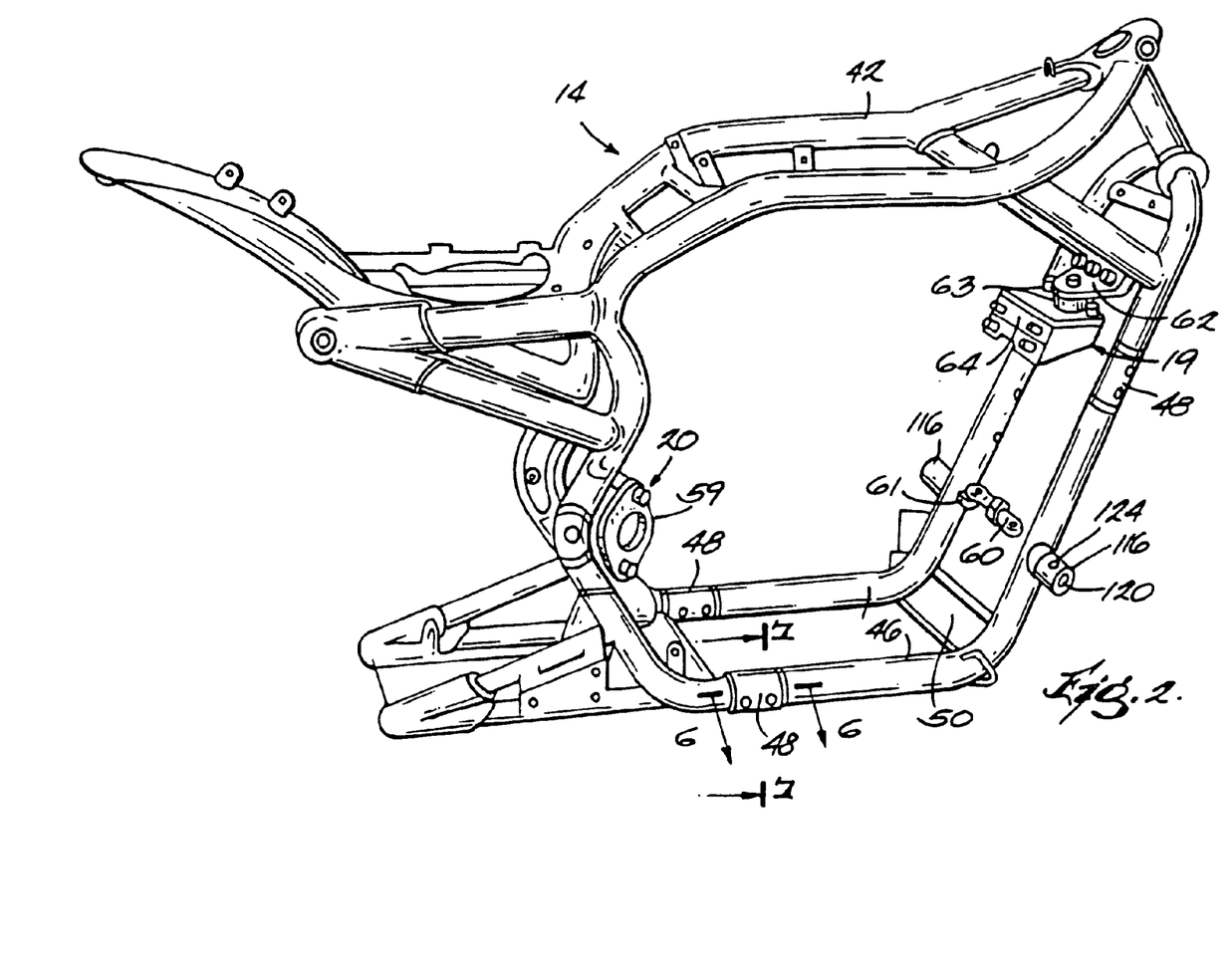
FIG. 2 is a perspective view of the frame of the motorcycle.
Figure 3:
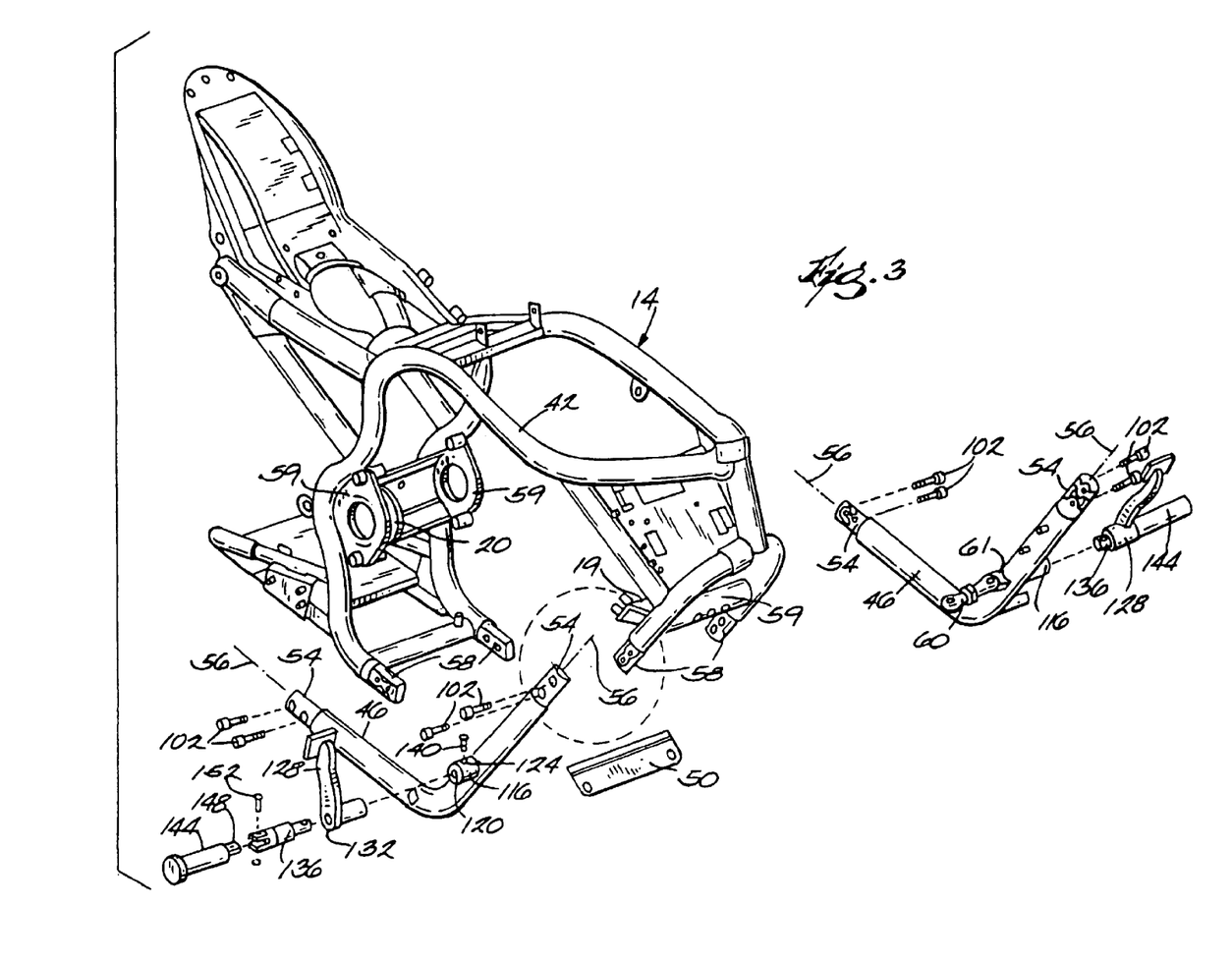
FIG. 3 is an exploded view of the frame.

As seen in FIGS. 2 and 3, the frame 14 includes a base portion 42, two removable portions 46 mounted to the base portion 42 at joints 48, and a cross-brace 50 between the removable portions 46. The removable portions 46 are substantial mirror images of each other, except as pointed out below. Therefore, only one of the removable portions 46 will be described. Referring to FIG. 3, each removable portion 46 includes opposite mating ends 54 having central axes 56, and the base portion 46 includes free ends 58. Both the base portion 42 and the removable portion 46 include mounting points to which the engine and power train assembly 18 is mounted. The illustrated frame 14 is configured to isolatingly support the motorcycle engine 18. The resilient mount assemblies 19, 20 mount to mounting portions 59 of the base portion 42 and resiliently secure the engine 18 within the frame 14 as described further below. A tie link 60 substantially prevents lateral movement of the engine 18 with respect to the frame 14 while allowing limited fore-aft and up-down movement of the engine 18 within the frame 14. The tie link 60 is pivotally intercoupled between the engine 18 and a mounting tab 61 on one of the removable portions 46. As illustrated, the mounting tab 61 is provided on the left removable portion 46, however the mounting tab 61 could be provided on the right removable portion 46, if desired.

Referring to FIG. 2, the front mount assembly 19 includes a frame mounting bracket 62, a front mount 63 and an engine mounting bracket 64. The frame mounting bracket 62 is secured to the front mounting portion 59 and the front mount 63 is secured to the frame mounting bracket 62. The engine mounting bracket 64 is secured to the front mount 63 and is secured to a front cylinder head 68 (see FIG. 1) of the engine 18. The front mount 63 is made of a resilient material (e.g. rubber) such that the engine and power train assembly 18 and the frame 14 are movable with respect to each other.

Figure 4:
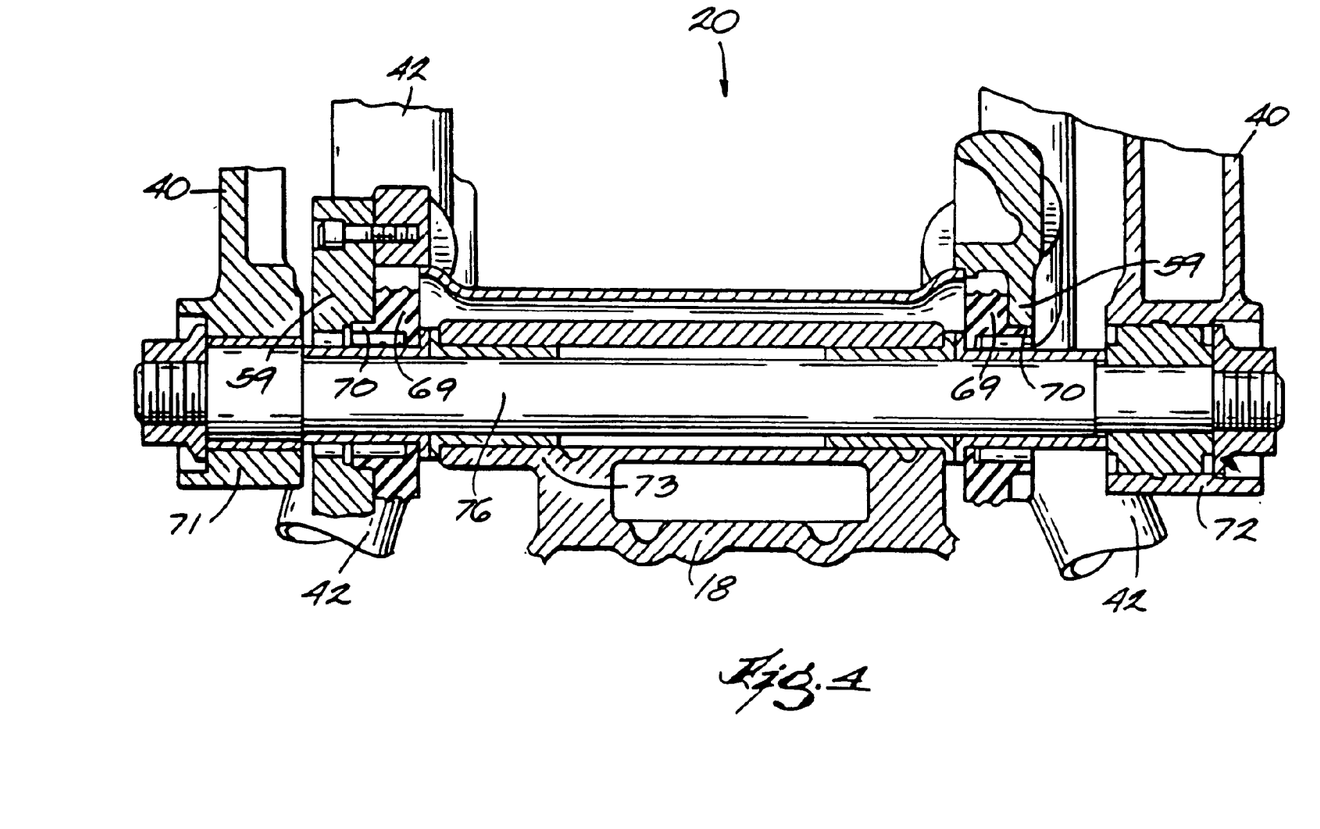
FIG. 4 is a cross-section view taken along line 4—4 in FIG. 1.

Referring to FIG. 4, the rear resilient mount assembly 20 includes a pair of substantially cylindrical rear mounts 69 that are made of a resilient material (e.g. rubber) and include flange portions 70 received by the rear mounting portions 59. The swingarm 40 includes first and second pivot ends 71, 72 and the engine and drive train assembly 18 includes a pivot boss 73. A pivot shaft 76 extends through the first pivot end 71, the rear mounts 69, the pivot boss 73, and the second pivot end 72. The pivot shaft 76 pivotally couples the engine 18 to the swingarm 40. Also, the pivot shaft 76 engages the rear mounts 69 such that the pivot shaft 76, and thus the engine and drive train assembly 18 and the swingarm 40 are resiliently coupled to the frame 14. Clearance is provided between the pivot shaft 76 and the rear mounting portions 59 to allow the pivot shaft 76, the engine and drive train assembly 18, and the swingarm 40 to move with respect to the frame 14.

Because the engine 18 is isolatingly supported within the frame 14, the frame 14 is preferably significantly stronger and stiffer than a frame having an engine and transmission assembly rigidly mounted thereto. The reason for this is that stresses applied to the frame 14 due to, for example, bumps in the road, acceleration and braking maneuvers, as well as other vehicle handling maneuvers, are carried almost exclusively by the frame 14. In contrast, when an engine and transmission assembly is rigidly mounted to a frame, the engine and transmission assembly bears a greater portion of the operating loads, which effectively stiffens the frame.

Vehicle torsional loads (e.g. such as those generated during cornering maneuvers) are generally transmitted from the rear wheel 26 through the swingarm 40 to the pivot shaft 76. Due to the configuration of the frame 14, the engine and transmission assembly 18, and the mount assemblies 19, 20, the pivot shaft 76 transmits the torsional loads to the engine and transmission assembly 18 and subsequently to the tie link 60, thereby subjecting the tie link 60 to tensile and compressive loads. Because the tie link 60 is pivotally coupled to the removable portion 46 as well as the engine and transmission assembly 18, the tie link 60 generally only transmits the vehicle torsional loads to the removable portion 46 in an axial manner. In this respect, the loads transmitted by the tie link, to the removable portion 46 via the mounting tab 61 are substantially single-axis loads (e.g. substantially no bending loads are transmitted by the tie link). Thus the removable portion is subjected to stresses transmitted by the frame 14 as well as by the engine and transmission assembly 18. Although the illustrated embodiment of the invention is configured for use with a motorcycle having a resiliently supported engine, the teachings of the present invention are also applicable to motorcycles having engines that are rigidly mounted to the frame.

Figure 5:
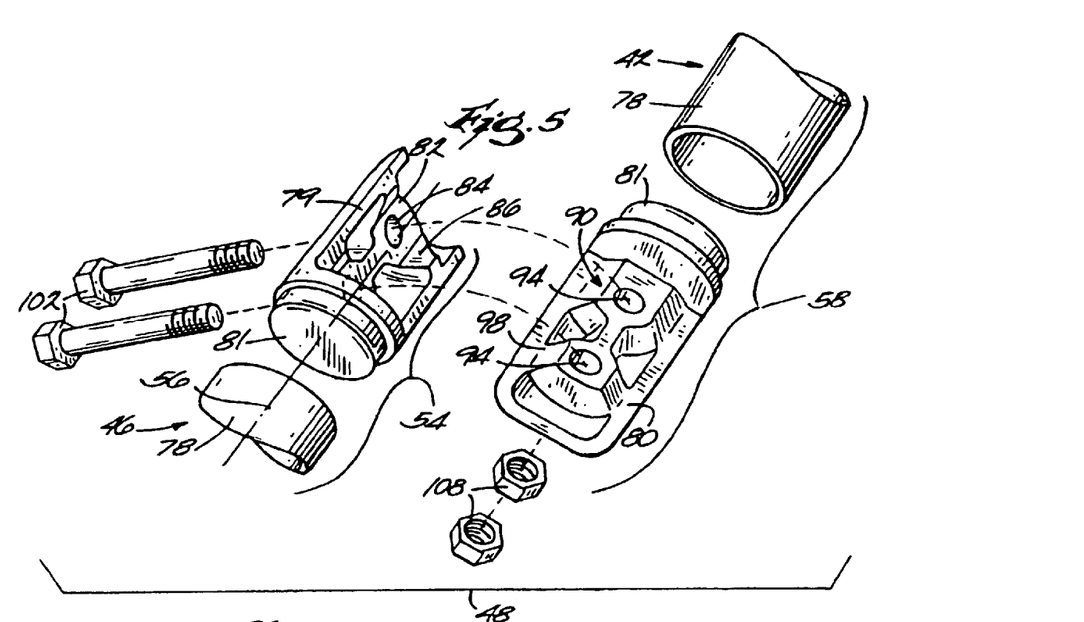
FIG. 5 is an enlarged exploded view of the portion of the frame encircled in FIG. 3.

With reference to FIG. 5, both the removable portion 46 and base portion 42 include tubular bodies 78 having open ends. The mating end 54 of the removable portion 46 and the free end 58 of the base portion 42 include female and male end caps 79, 80, respectively, that have chamfered or reduced diameter ends 81. The reduced diameter ends 81 are inserted into and welded to the open ends of the respective tubular bodies 78.

The female end cap 79 includes a recessed socket 82 having bolt holes 84. The socket 82 is characterized by slanted or angled walls 86 that cause the socket 82 to narrow from its top to its bottom. The male end cap 80 includes a protrusion 90 having bolt holes 94. The protrusion 90 is characterized by slanted or angled walls 98 that cause the protrusion 90 to narrow from its bottom to its top. The angled walls 86, 98 extend in a direction that is substantially parallel to the central axis 56 of the respective mating end 54. It should be noted that the female and male end caps 79, 80 may be switched so that the male end cap 80 is welded to the removable portion 46 and the female end cap 79 is welded to the base portion 42. Also, although the mating surfaces of the illustrated walls 86, 98 are substantially planar, the mating surfaces could alternatively be curved.

Figures 6, 7:
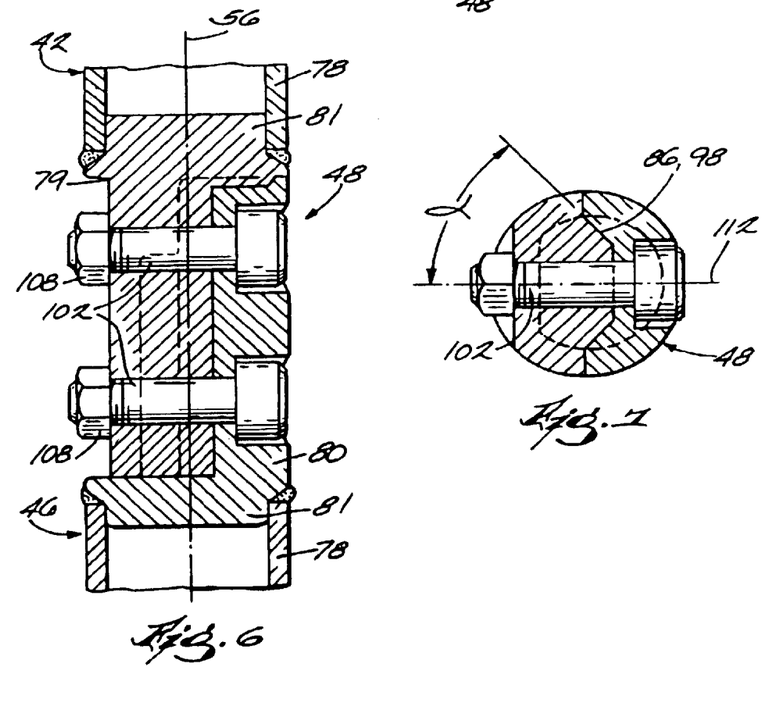
FIG. 6 is a cross-section view taken along line 6—6 in FIG. 2.
FIG. 7 is a cross-section view taken along line 7—7 in FIG. 2.

As seen in FIGS. 5 and 6, the socket 82 snugly receives the protrusion 90 such that the angled walls 86, 98 are in intimate contact with each other and the bolt holes 84, 94 are aligned with each other. Fasteners, such as the illustrated bolts 102, extend through the bolt holes 84, 94 and are secured with nuts 108 to fasten the mating ends 54 of the removable portion 46 to the free ends 58 of the base portion 42. Alternatively, one of the bolt holes 84, 94 may be threaded such that the bolts 102 threadedly engage one of the end caps 79, 80 directly.

The bolts 102 each define a fastener axis 112 (FIG. 7), and the angled walls 86, 98 are angled α (about 45° in the illustrated construction) with respect to the fastener axis 112. Due to the angle α of the wall engagement, and the snug engagement between the socket 82 and the protrusion 90, the walls 86, 98 bear substantially all shear stress (e.g., from bumps and/or handling maneuvers as discussed above) transmitted through the joint 48 such that the fasteners 102 are exposed to substantially no shear stress.

With reference to FIGS. 2 and 3, a footpeg mounting structure is affixed to the removable portion 46. The footpeg mounting structure includes a cylindrical boss 116 that is welded to the removable portion 46. The cylindrical boss 116 includes a longitudinal bore 120 and a cross-bore 124 extending perpendicular to the longitudinal bore 120. A foot pedal 128 that may actuate, among other things the brake, clutch, or transmission, of the vehicle includes a pedal bore 132 that is aligned with the longitudinal bore 120 of the cylindrical boss 116, and a clevis pin 136 extends through the pedal bore 132 and into the longitudinal bore 120. A cross pin 140 extends through the cross-bore 124 to anchor the clevis pin 136 within the cylindrical boss 116, and to mount the pedal 128 to the cylindrical boss 116. A footpeg 144 is pivotally mounted to the clevis pin 136 by positioning a tongue portion 148 of the footpeg 144 in the forked end of the clevis pin 136, and extending a footpeg pin 152 through the forked end and tongue portion 148.

Figure 8:
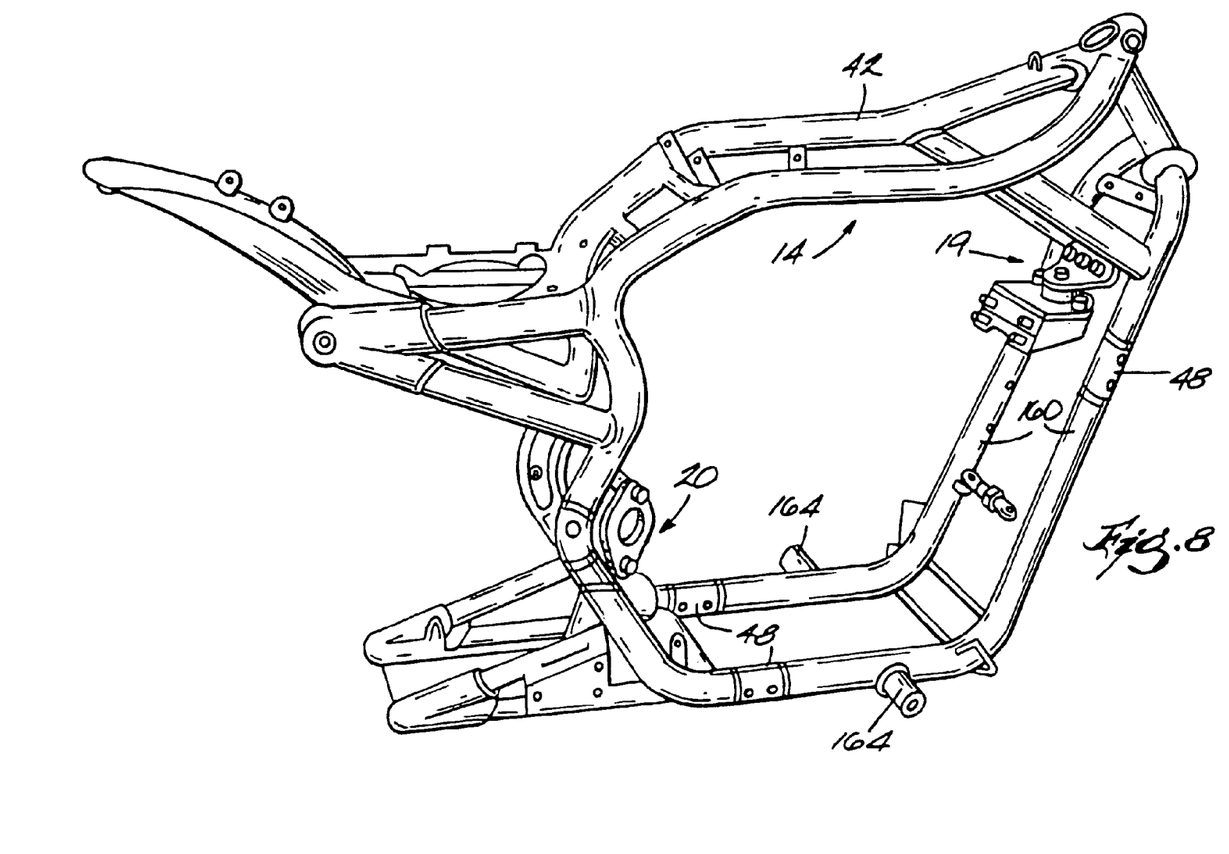
FIG. 8 is a perspective view of the frame with a second removable portion substituted for the removable portion illustrated in FIG. 2.

FIG. 8 illustrates the frame 14 with alternative removable portions 160 substituted for the above-described removable portions 46. The alternative removable portions 160 are substantially identical to the above-described removable portions 46, except that they have cylindrical bosses 164 welded at locations different from the locations on the above-described removable portions 46. The position of the motorcycle footpegs 144 may therefore be changed by removing the above-described removable portions 46 of the frame 14 and replacing them with the alternative removable portions 160 of the frame 14. The original pedals 128 and footpegs 144 may then be mounted to the cylindrical bosses 164 of the alternative removable portion 160 or new pedals and footpegs may be provided.

Various features of the invention are set forth in the following claims.

What is claimed is:

1. A method for relocating the position of a footpeg on a motorcycle frame having a base portion and a first removable portion removably mounted to the base portion at a joint, the base and first removable portions supporting and bearing loads created during motorcycle and engine operation, the footpeg being mounted to footpeg mounting structure on the first removable portion and being positioned in a first footpeg position, the method comprising:
    removing the first removable portion from the base portion;
    providing a second removable portion that is removably mountable to the base portion at the joint and includes footpeg mounting structure at a second footpeg position different from the first footpeg position;
    mounting the second removable portion to the base portion in place of the first removable portion; and
    interconnecting a footpeg to the footpeg mounting structure on the second removable portion.

2. The method of claim 1, wherein the joint is defined by a free end of the base portion and a mating end of the second removable portion, wherein one of the free end and the mating end includes a male profile and the other of the free end and the mating end includes a female profile, and wherein the act of mounting the second removable portion to the base portion includes mating the male and female profiles.

3. The method of claim 2, wherein the male profile snugly fits within the female profile, and wherein the act of mounting the second removable portion to the base portion includes extending a fastener through the joint.

4. The method of claim 3, further comprising applying loads to the joint during operation of the motorcycle and using he snug fit between the male and female profiles to reduce shear stress on the fastener caused by such loads on the joint.

5. The method of claim 1, wherein the act of removing includes decoupling the removable portion from the engine.

6. The method of claim 1, wherein the frame resiliently supports an engine and drive train assembly and the motorcycle includes a tie-rod interconnecting the engine and drive train assembly and the first removable portion, wherein the act of removing includes disconnecting the tie-rod from the first removable portion, and wherein the act of mounting includes connecting the tie-rod to the second removable portion.

7. A motorcycle frame for supporting a motorcycle engine, the frame comprising:
    a base portion having a free end including first angled walls;
    a removable portion having a mating end including second angled walls, said first and second angled walls mating with each other to define a joint when said removable portion is mounted to said base portion;
    a fastener extending through said joint;
    a resilient mount that resiliently interconnects the motorcycle engine and the frame; and
    a tie-rod interconnecting the motorcycle engine and the removable portion, wherein the tie-rod transmits loads from the engine to the removable portion,
    wherein both of said base and removable portions include engine mounting structure for mounting an engine thereto, said base and removable portions being adapted to bear loads caused by operation of the motorcycle, and wherein said mating angled walls bear substantially all shear stresses transmitted through said joint such that said fastener is exposed to substantially no shear stress.

8. A motorcycle frame for supporting a motorcycle engine, the frame comprising:
    a base portion having a free end including first angled walls;
    a removable portion having a mating end including second angled walls, said first and second angled walls mating with each other to define a joint when said removable portion is mounted to said base portion; and
    a fastener extending through said joint;
    wherein both of said base and removable portions include engine mounting structure for mounting an engine thereto, said base and removable portions being adapted to bear loads caused by operation of the motorcycle, and wherein said mating angled walls bear substantially all shear stresses transmitted through said joint such that said fastener is exposed to substantially no shear stress, wherein said removable portion includes a central axis, and wherein said first and second angled walls extend in a direction that is substantially parallel to said central axis.

9. The motorcycle frame of claim 8, wherein said fastener extends through said joint along a fastener axis, and wherein said first and second angled walls are at an acute angle with respect to said fastener axis, said angled walls snugly fitting together and in intimate contact with each other.

10. The motorcycle frame of claim 9, wherein said acute angle is about 45°.

11. The motorcycle frame of claim 8, wherein said free end of said base portion and said mating end of said removable portion each include a hollow tubular end and an end cap welded to said hollow tubular end, and wherein said first and second angled walls are defined by said end caps.

12. The motorcycle frame of claim 11, wherein said end caps include reduced diameter ends received within said hollow tubular ends.

13. The motorcycle frame of claim 8, wherein said removable portion includes footpeg mounting structure at a first fixed position on said removable portion, said motorcycle further comprising a footpeg mounted to said footpeg mounting structure.

14. The motorcycle frame of claim 13, further comprising a second removable portion including footpeg mounting structure at a second fixed position different from said first fixed position to enable the footpeg to be moved to said second position by replacing said removable portion with said second removable portion and mounting said footpeg to said mounting structure on said second removable portion.

15. The motorcycle frame of claim 8, further comprising a resilient mount that resiliently interconnects the motorcycle engine and the frame, and a tie-rod interconnecting the motorcycle engine and the removable portion, wherein the tie-rod transmits loads from the engine to the removable portion.

16. The motorcycle frame of claim 15, wherein the tie-rod is pivotally coupled to the engine and the removable portion.

17. A removable portion of a motorcycle frame comprising at least one mating end having one of a male and female surface having at least two angled walls with different angles, the at least two angled walls adapted to intimately contact at least two angled walls having different angles of the other of a male and female surface of the rest of the frame; and engine mounting structure adapted to carry loads transmitted by a motorcycle engine, wherein said at least one mating end includes a central axis, and wherein said two angled walls extend in a direction that is substantially parallel to said central axis.

18. The removable portion of claim 17, wherein said end includes a hollow tubular member and an end cap having a portion at least partially received within and welded to said hollow tubular member, and wherein said surface is defined by said end cap.

19. The removable portion of claim 18, wherein said portion of said end cap that is received within said hollow tubular member includes a chamfered diameter surface.

* * * * *